PROTECTIVE MEANS FOR SUPERCONDUCTING SOLENOIDS

Filed Dec. 12, 1962

WITNESSES
Theodore F. Wrobel
David J. Gould

INVENTORS
Henry Riemersma
Cameron B. Satterthwaite
BY
F. E. Browder
ATTORNEY

United States Patent Office 3,183,413
Patented May 11, 1965

3,183,413
PROTECTIVE MEANS FOR SUPER-CONDUCTING SOLENOIDS

Henry Riemersma, Penn Hills, and Cameron B. Satterthwaite, Monroeville, Pa., assignors to Westinghouse Electric Corporation, East Pittsburgh, Pa., a corporation of Pennsylvania Filed Dec. 12, 1962, Ser. No. 244,200
5 Claims. (Cl. 317—123)

This invention relates in general to superconducting solenoids and more particularly to means for protecting a superconducting solenoid against burn out and the apparatus containing the superconducting solenoid against explosion caused by evaporation of the solenoid coolant at an explosive rate due to the sudden release of stored energy in the magnetic field of the superconducting solenoid in the event that the superconducting solenoid suddenly loses its superconducting properties and become normal. By normal it is meant that the solenoid becomes an electrical resistor.

In the operation of superconducting solenoids, there is always the possibility that for some reason the solenoid may lose its superconducting properties and become normal. If this happens, a large portion of the energy stored in the magnetic field of the superconducting solenoid is dissipated in the form of heat. The energy stored in the magnetic field of the superconducting solenoid is given by the equation $$W_s=\frac{1}{2}LI_s^2$$

where $W_s$ is the energy, L is the inductance of the superconducting solenoid and $I_s$ is the current flowing in the superconducting solenoid before the solenoid becomes normal. Because a superconducting solenoid is designed with inherently high inductance and carries high current, this stored energy can be appreciable and should most of the energy be suddenly dissipated in the form of heat, there is the possibility that the solenoid will be burned out or that the coolant of the solenoid will be caused to evaporate at an explosive rate.

Accordingly, it is the general object of this invention to provide a new and improved superconducting solenoid.

It is a more particular object of this invention to provide a new and improved superconducting solenoid with means to gradually dissipate a large portion of the energy stored in the magnetic field of the solenoid in the event that the superconducting solenoid becomes non-superconducting.

Other objects of the invention will be in part obvious and will in part appear hereinafter.

Briefly, the persent invention accomplishes the above-cited objects by providing a superconducting solenoid with a closely coupled second coil or auxiliary winding which is in essence a shorted turn capable of dissipating as heat a large portion of the magnetic field energy of the main solenoid at a reduced rate, thus reducing the temperature rise in the main solenoid and the rate of coolant evaporation. More specifically, the coil form on which the superconducting solenoid is wound may be used for this second coil. The coil form is so constructed and the solenoid is so wound as to provide maximum magnetic coupling between the solenoid and the coil form. The coil form is made of a material such as high conductivity copper which is electrically conductive at ambient temperatures but which does not become superconducting, thus the coil form will have a high resistance compared to the resistance of the superconducting solenoid and the coil form will not affect the magnetic flux produced by the solenoid when the solenoid is operated in the superconducting state. If the coil form were to become superconducting it would have an induced magnetic field of its own which would not decay in time and which would oppose the superconducting solenoid magnetic field. Only when the solenoid becomes normal is it desired that the coil form carry electrical current, therefore a non-superconducting metal having high but finite electric conductivity at the temperature at which the solenoid ceases to be superconducting is used for the coil form.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
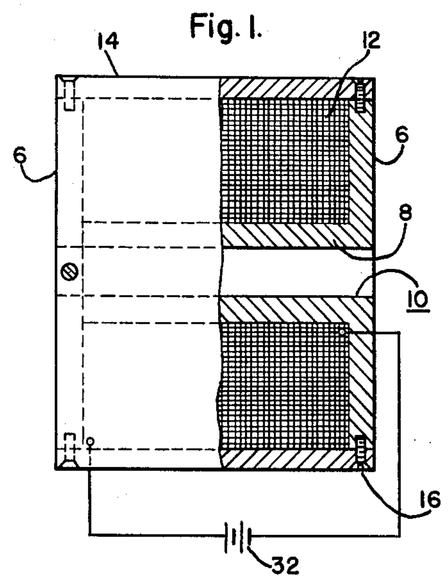
FIGURE 1 shows an elevation with parts broken away of one embodiment of the invention.

As best seen in FIG. 1, our invention includes a solenoid 12 comprising a plurality of turns of material capable of becoming superconducting. We enclose these turns in a coil form or spool-like structure 10 having a central member 8 and disc-like end flanges 6. A cylindrical member 14 is attached to the end flanges 6. The cylinder 14, which is in essence a shorted turn, may be attached to the disc-like end flanges 6 by any suitable means such as set screw 16 after the winding of the superconducting turns 12 on spool 10. It will be noted that the superconducting solenoid 12 is now located inside of a toroidal structure formed by joining the cylinder 14 to the spool 10. The inherent geometry of this arrangement provides maximum magnetic coupling between the solenoid 12 and the enclosing toroidal but finite structure. The spool 10 and cylinder 14 may be composed of any material having high electrical conductivity at temperatures above which the solenoid ceases to be superconducting but which does not itself become superconducting such as high conductivity copper, or aluminum. The superconducting solenoid 12 is provided with a source of direct current 32.

Figure 2:
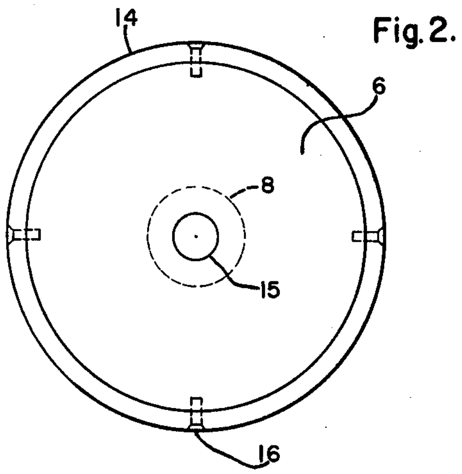
FIG. 2 illustrates an end view of the embodiment of the invention shown in FIG. 1.

Turning now to FIG. 2, one may see how the cylinder 14 is joined to the end flange 6 by means of set screws such as set screw 16. An aperture 15 is provided in the central member 8 to permit access to the central part of the solenoid where the magnetic field is strongest. It will be noted that the central member 8 also forms a shorted turn inside of the solenoid windings.

Figure 3:
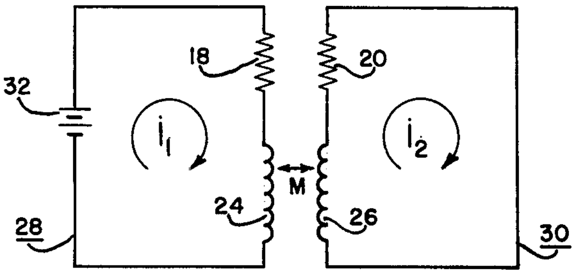
FIG. 3 is a schematic diagram of the approximate equivalent circuit of a superconducting solenoid equipped with the auxiliary protecting coil of the invention.

In FIG. 3 there is illustrated an approximate equivalent circuit of the solenoid and coil form illustrated in FIGS. 1 and 2. Circuit 28 is a schematic representation of the superconducting solenoid and its associated D.C. power supply such as battery 32. Resistor 18 represents in lumped form the distributed resistance of the superconducting turns of the solenoid. Inductance 24 represents in lump form the inductance of the superconducting solenoid. It will be noted that resistor 18 will have a value at or near zero ohms when the solenoid is cooled to the temperature at which it becomes superconducting. However, if for some reason, the solenoid should become non-superconducting the resistance 18 will increase appreciably. In FIG. 3, $i_1$ represents the current circulating through the solenoid as a result of the applied voltage, the conventional direction of current flow, from positive to negative is used in the illustration. Equivalent circuit 30 represents, in schematic form, the electrical circuit of the toroidal coil form shown in FIGS. 1 and 2. Resistor 20 is the equivalent resistance of the toroidal coil form.

As the coil form is constructed of a metal which is incapable of being rendered superconducting, the resistance 20 will be appreciably greater than resistance 18 of the solenoid when the solenoid and its associated coil form are cooled to a temperature at which the solenoid becomes superconducting. Inductance 26 represents the inductance of the toroidal coil form illustrated in FIGS. 1 and 2. The mutual inductance between the solenoid and the toroidal coil form is represented by M. The circulating current induced in the coil form by a change in the current in the solenoid is represented by $i_2$. The direction of the current in the coil form is represented as being the same, i.e., clockwise, as the direction of the current in the solenoid. When part of the energy stored in the magnetic field of the solenoid is transferred by transformer action to the coil form due to an increase in solenoid resistance 18 caused by the solenoid becoming non-superconducting and an accompanying decrease in solenoid current, the energy will be dissipated in the form of heat in resistance 20, but because resistance 20 is lower than the non-superconducting resistance of resistor 18 the energy will be dissipated at a reduced rate by the circulating current $i_2$ thus reducing the temperature rise in the solenoid and the rate of coolant evaporation. As long as there is no change in the current $i_1$ of the solenoid no current $i_2$ will circulate in the coil form. If the current $i_1$ changes due to a loss of superconductivity by the solenoid then the current $i_2$ will be induced in the coil form through the mutual inductance M. The way that the energy is transferred from the solenoid to the coil form is similar to the mode of energy transfer from the primary to the secondary of a pulse transformer. The solenoid is a direct current device, but when there is an abrupt change in the solenoid current, a current is induced in the coil form of the solenoid which is analogous to a pulse transformer secondary.

If the coil form as described is not present or is constructed of a non-conductor, then the energy given up by the solenoid when its current is reduced by becoming non-superconducting must be dissipated as heat in resistance 18 alone.

It will, therefore, be apparent that there has been disclosed a superconducting solenoid which is self-protecting against burn out and explosive evaporation of coolant in the event the solenoid becomes non-superconducting.

Since numerous changes may be made in the above-described apparatus and different embodiments may be made without departing from the spirit thereof, it is intended that all the matter contained in the foregoing description or shown in the accompanying drawings shall be interpreted as illustrative and not in a limiting sense.

We claim as our invention:

1. A solenoid comprising a plurality of turns of material capable of being made superconducting, and at least one shorted turn of a material having electrical conductivity at ambient temperature and being incapable of being made superconducting, said shorted turn enclosing said solenoid and magnetically coupled thereto.

2. Magnetic flux producing apparatus comprising, a plurality of turns of at least one electrical conductor capable of being made superconducting, an electrically conductive spool, said plurality of turns being wound on said electrically conductive spool, and at least one shorted turn of electrically conductive material coupled magnetically to said plurality of turns.

3. A magnet comprising, a spool of metal which is electrically conductive at ambient temperature but is incapable of being made superconducting, a plurality of turns of at least one electrical conductor formed of material capable of being made superconducting, said plurality of turns being wound on said spool, and a shorted turn of the same metal as used for said spool coupled magnetically to said plurality of turns, said shorted turn joined to said metal spool.

4. A solenoid comprising a plurality of turns of at least one electrical conductor formed of material capable of being made superconducting, a coil form for said solenoid comprising a central member about which said plurality of turns are wound, metal flanges extending radially from said central member, and a shorted metal turn enclosing the solenoid and attached to said flanges, said shorted metal turn being magnetically coupled with said solenoid, said coil form being constructed of a metal which is incapable of becoming superconducting.

5. A superconducting magnet system comprising a source of direct current potential, a solenoid including a plurality of turns of electrical conductor capable of being made superconducting, means electrically connecting said source of direct current potential with said solenoid to cause an electrical current to flow through said solenoid and create a magnetic field, and electrically conductive means magnetically coupled with said solenoid forming a short circuited turn around said solenoid, said electrically conductive means having a high resistance compared with the resistance of said solenoid when subjected to a temperature at which said solenoid becomes superconducting, said electrical conductive means conducting current when the current flowing through said solenoid changes, to aid in dissipating the energy stored in the magnetic field of said solenoid when said solenoid changes from a superconducting state to a normal resistive state.

References Cited by the Examiner

UNITED STATES PATENTS

| | | | |
|---|---|---|---|
| 2,946,973 | 7/60 | Lufcy | 336—213 |
| 3,060,353 | 10/62 | Shansky et al. | 336—213 |
| 3,109,963 | 11/63 | Geballe | 317—158 |

JOHN F. BURNS, *Primary Examiner.*